United States Patent Office 2,884,472
Patented Apr. 28, 1959

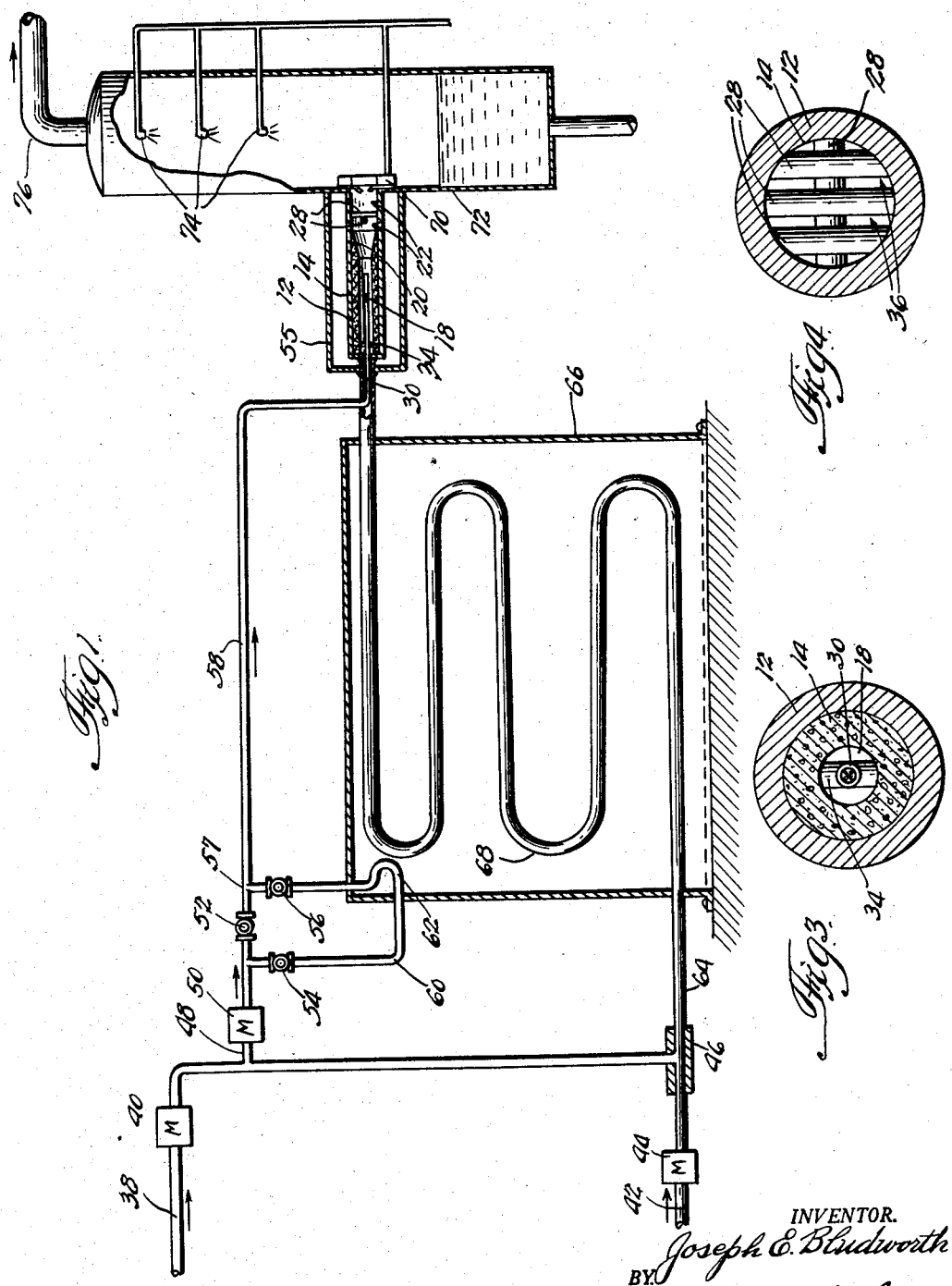

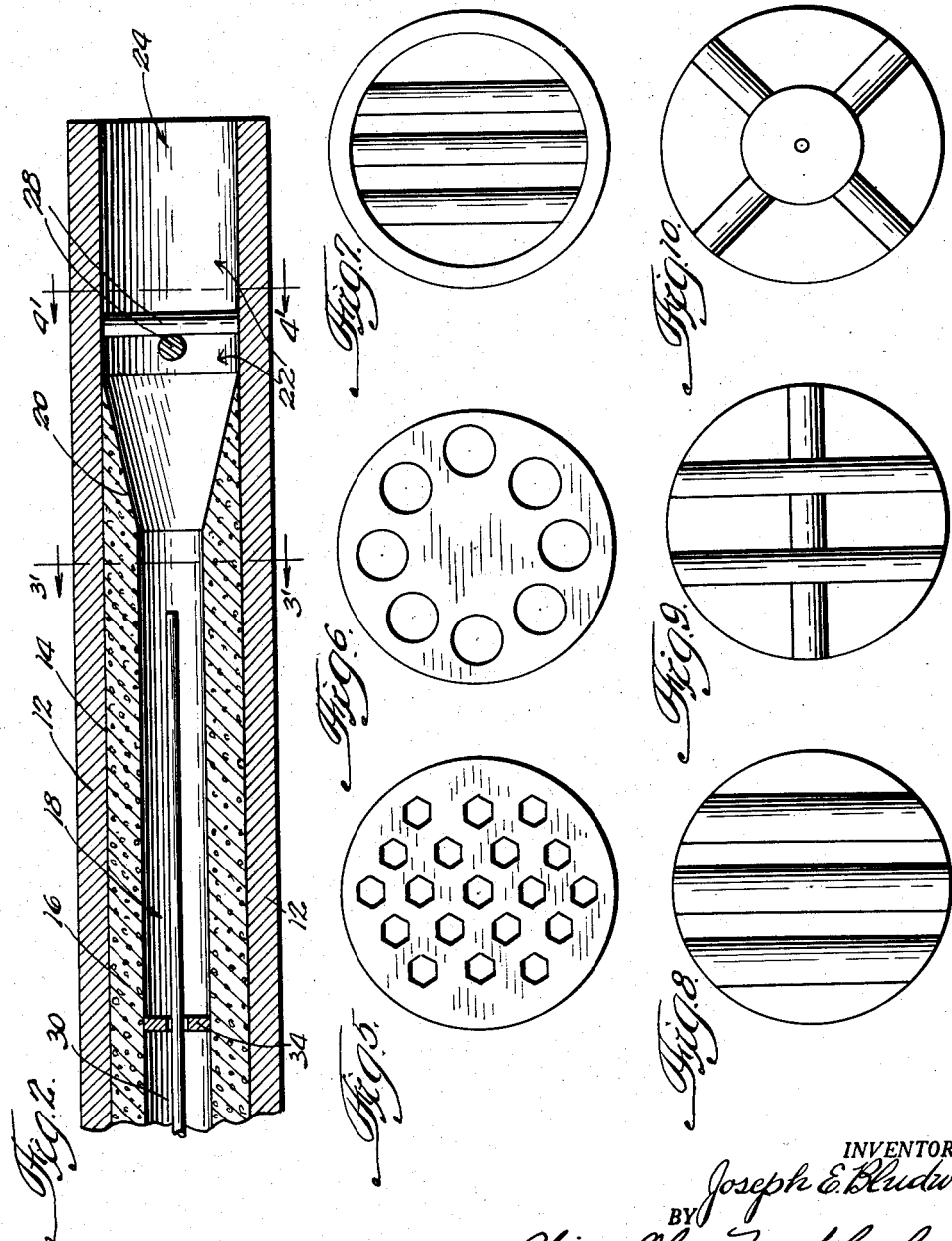

2,884,472

ACETYLENE PRODUCING PROCESS

Joseph E. Bludworth, Corpus Christi, Tex., assignor to Delhi-Taylor Oil Corporation, Dallas, Tex., a corporation of Delaware Application May 29, 1956, Serial No. 588,168

9 Claims. (Cl. 260—679)

This invention relates to a process and apparatus for reacting gases under incomplete combustion conditions and more particularly to a process and apparatus which is especially useful for the conversion of gaseous hydrocarbons, such as methane, into acetylene. The invention herein disclosed is in certain respects an improvement over the invention disclosed and claimed in my copending application Serial No. 224,540, filed May 4, 1951, now Patent No. 2,785,213, issued March 12, 1957.

In that prior application there is disclosed a process for producing acetylene by a process involving the partial combustion of a hydrocarbon such as methane. In accordance with the disclosure in that application, a mixture of oxygen and methane in the volume ratio of approximately 1 to 2 is rapidly heated to a temperature between 1200 and 2000° F. by passing a stream of the mixture at an exceedingly high velocity through an elongated coil disposed in a tubular radiant furnace under such conditions that no substantial reaction occurs in the coil. Thereafter the preheated mixture is discharged into a reactor maintained at a temperature above about 2000° F. by the combustion reaction between the oxygen and a portion of the methane. This partial combustion in the reactor supplies sufficient heat to cause the unreacted methane to be converted into acetylene. Thereafter the hot gases are immediately quenched and the acetylene contained therein is separated.

The process disclosed in that application has been highly satisfactory and it has been possible by the process to convert a high percentage of the methane charged to the system into acetylene. However, it has been found that it is often difficult to control the conditions in the rector or that optimum yields of acetylene will be produced. The factors that must be interrelated and controlled in order to effect proper combustion in the reactor include the relative percentages of methane and oxygen in the gas being reacted, the degree of preheat that must be imparted to the mixture before passing to the reactor, the velocity of the mixture through the preheating coils and into the reaction zone, the velocity of the gases through the reaction zone and the time that the reactants are permitted to remain at reaction tempertures above about 2000° F.

Accordingly, it is an object of this invention to provide a process and apparatus in which the acetylene-producing reaction may be more readily controlled.

A further object of this invention is the provision of a reactor which permits the acetylene-producing process to be more easily placed and maintained on stream.

A still further object of this invention is the provision of a process and apparatus which permits the degree of preheat of the oxygen-methane mixture in the preheater tube to be somewhat less for optimum conversions than in the type of reactor specifically disclosed in the above referred to copending application.

A still further object of this invention is the provision of a process in which a portion of the gaseous products of reaction freed of acetylene are recycled to the process.

A still further object of the present invention is the provision of a reactor which permits the introduction of an independent stream of oxygen into the preheated mixture of gaseous hydrocarbon and oxygen and affords ready control and maintenance of the reaction.

A still further object of the present invention is the provision of apparatus whereby mixtures of gaseous hydrocarbons such as methane and oxygen may be reacted by incomplete combustion in a manner to sustain the reaction.

In accordance with one embodiment of this invention, a reactor is provided which includes an elongated axial passageway having a uniform diameter diverging to an expanded reaction zone having therein forwardly interposed a baffle element of a refractory material around and through which the gases can flow at high velocity. There is provided within the reactor a tube of refractory material centrally located in the forward portion of the reaction passage through which is passed an independent stream of oxygen directed against the baffle element placed in the forward portion of the expanded reaction zone.

In operation the preheated gases (oxygen and methane) flow into the forward portion of the reactor and around the ceramic tube provided for interjection of the oxygen stream. A relatively minor independent stream of oxygen is interjected in the forward portion of the reactor toward the baffle element. The oxygen and mixed gases combine with a secondary preheating effect and react at a point immediately beyond the baffle element in the expanded portion of the reaction zone. The reaction is initiated at a point immediately beyond the baffle by virtue of the decreased velocity of the gaseous mixture in the expanded portion of the reaction zone and the surface effect provided by the baffle. The reaction conditions are maintained and controlled by the independent oxygen stream within the reactor and the reaction is not swept out of the reactor into the quenching area. The hot effluent gaseous reaction products are quenched at a point immediately beyond the reactor and the acetylene recovered therefrom.

For a more complete understanding of this invention reference is now made to the accompanying drawings in which:

Figure 1 is a diagrammatic representation of an apparatus for carrying out the over-all process of this invention;

Fig. 2 is a broken longitudinal sectional view of a reactor constructed in accordance with one embodiment of this invention and adapted for use in the apparatus shown in Fig. 1;

Fig. 3 is a transverse sectional view taken along line 3'—3' of Fig. 2;

Fig. 4 is a transverse sectional view taken along line 4'—4' of Fig. 2, and specifically shows an end view of a mounted baffle element; and Figs. 5, 6, 7, 8, 9 and 10, respectively, show several baffle elements of various designs suitable for use in the apparatus of the present invention.

Referring first to Fig. 2, the acetylene reactor there shown comprises an elongated cylindrical reactor tube 12 of a highly refractory material such as silicon carbide having an open end passageway 14 extending therethrough. In the upstream end of the passageway is molded or otherwise formed a tube 16 of a highly refractory material having an axial bore 18 extending therethrough. The tube 16 may also be formed of silicon carbide or similar refractory and is provided with an outwardly flared diverging portion 20 which merges with the walls of the passageway 12; thus the more restricted forward bore or passageway 18 provides the gas inlet or upstream end extending for a major proportion of the length of the reactor, and the preheated gases pass in a straight line from passageway 18 through the flared portion 20 around and through a baffle element 28 in an enlarged passageway or expanded reaction zone 22, and through a discharge or gas outlet end 24. A ceramic or refractory inlet tube 30 is centrally located and longitudinally disposed in the forward end of the reactor and extends to a point just short of the diverging walls of the forward portion of the reactor and is supported and spaced from the side walls of the longitudinal bore 18 by a spacing element of refractory material 34. Immediately downstream of the flared portion 20 of the reactor and within the upstream portion of passageway 22 is mounted the baffle element 28 shown in Fig. 4.

Figs. 5, 6, 7, 8, 9 and 10 illustrate a number of different types of baffle elements that may be used. They are all made of a refractory material such as silicon carbide and accomplish the same purpose as the baffle element 28 shown in Figs. 2 and 4 and are useful in the process and apparatus of the present invention.

Referring now to Fig. 1, there is here described a specific example of a process for carrying out this invention utilizing the reactor specifically described above. This general over-all process is similar to that disclosed in the aforesaid application Serial No. 224,540. In this specific example substantially pure methane gas substantially free of higher hydrocarbons was charged into a conduit 42 and through a meter 44 at the rate of 3000 standard cubic feet per hour and pure oxygen gas was charged through the conduit 38 and meter 40 at a rate of about 1665 standard cubic feet per hour. A side stream of oxygen in the amount of about 43 standard cubic feet per hour was withdrawn through a conduit 48, meter 50, a valve 52 and conduit 58. The main methane and oxygen streams were mixed in a mixing box 46 and then discharged at ambient temperature (about 80° F.) and at a pressure of about 55 p.s.i. gauge into a conduit 64 leading into the preheater coil 68. This preheater coil was disposed in a radiant heat furnace 66 and comprised two sections arranged in series of a high chrome steel alloy which is capable of being heated to temperatures up to about 2000° F. or higher without deterioration. Generally in the construction of the primary preheater it is preferred to use steels having a high chrome content and which are substantially free of nickel and other impurities. As exemplary of such preferred metals are the stainless steels of number 446. Lower chrome steel series have been tested but with less satisfactory results. The pressure of the gases passed into the preheater coil was as aforesaid about 55 pounds per square inch gauge, and the inlet velocity was about 157 feet per second. The gaseous mixture was very rapidly heated in the preheater coil to a temperature of about 1660° F. The velocity of the gases emerging from the preheater coils was about 1785 feet per second and had a pressure of about 1.2 p.s.i. gauge. Thus the velocity of the preheated gases emerging from the primary preheater coils was far in excess of the flame velocity in the mixture at the prevailing temperature. It is preferred that this velocity be in excess of about twice the flame velocity exhibited by the mixture of oxygen and methane at the prevailing temperatures. Such high velocities are important to prevent the initiation within the coil of any reaction of the mixture which could be caused by local overheating in any place within the coil. If such reaction were allowed to occur, the preheating coil would rapidly burn out.

Referring now to Figs. 1 and 2, the preheated mixture of methane and oxygen was then immediately passed into the passageway 18 of the reactor 12, the reactor being enclosed within a suitable insulating box 55. The temperature of the gases passed into the reactor was about 1660° F. Oxygen passing from the side stream taken from conduit 58 was injected through the ceramic tube 30 located along the axis of the reaction tube 16. The oxygen in the tube 30 is heated and the heated mixture of methane and oxygen combines with the oxygen from the ceramic tube 30 in passageway 18 and is by such mixing further raised in temperature. The combined mixture flows through the diverging passageway 20 and through the sectors 36 (see Fig. 4) between the baffle elements 28 and the reaction in the reactor is initiated and stabilized so that in the area immediately downstream of the baffle the partial combustion of the methane in the main stream occurs. In this example the temperature at the diverging sector 20 wherein the supplementary stream of oxygen combined with the preheated streams of oxygen and methane was about 1750° F. The temperature of the reaction at a point immediately downstream from the baffle 28 was about 2390° F. In the reactor specifically used in this example the passageway 18 had a diameter of 1⅛″ and passageway 22 had a diameter of 2⅛″. The distance between the open end 22 of the reactor and the baffle element was 6¾″. In the reaction zone the oxygen is substantially all consumed and the high temperature achieved by the partial combustion of methane causes the conversion of the remainder of the methane to acetylene. It is important that the hot reaction products be immediately quenched and, as disclosed in the above, these products are immediately passed to a quench tower. Thus the hot reaction products are quenched by passage through the water quench ring 70 and the quench tower 72 which is provided with auxiliary water sprays 74. The resulting gases are passed through a conduit 76 to an acetylene absorber from which the acetylene may be removed from the gas by acetone or other suitable absorbent.

A typical gas analysis obtained at the discharge of the quench tank is given below:

| Gases: | Percent by volume |
|---|---|
| Acetylene | 11.4 |
| Carbon dioxide | 2.1 |
| Ethylene | 0.1 |
| Oxygen | 0.6 |
| Carbon monoxide | 23.9 |
| Hydrogen | 59.1 |
| Methane | 2.8 |
| | 100.0 |

It is also a part of the present invention to provide a system whereby the independent oxygen side stream may be preheated prior to passage into the tube 30. Referring to Fig. 1, the side stream of oxygen is carried through a conduit 48 and meter 50 to a juncture. By closing valve 52 and opening valves 54 and 56 the side stream can be caused to pass through valve 54, conduit 60, preheater coil 62, valve 56, juncture 57 and conduit 58 to the tube 30. Alternatively, where no preheating of the oxygen side stream is desired, the valve 52 is open and the valves 54 and 56 closed so that oxygen passes directly from meter 50 through valve 52 and conduit 58 to the tube 30. Intermediate and controlled preheating can also be achieved by throttling valves 52, 54 and 56 so that a portion of the side stream is preheated and mingles with unheated oxygen at juncture 57. It is of course apparent that other independent preheaters can be used in place of the preheater 66 for heating the oxygen side stream.

In accordance with one embodiment of this invention a portion or all of the gases from which the acetylene has been removed by a scrubber system (not shown) may be recycled through a conduit (not shown) to the methane charged into the system in conduit 42.

In accordance with the present invention it is preferred that the sequence of primary and secondary preheating of the oxygen and gaseous hydrocarbon mixtures be to temperatures between about 1200 and 2000° F. A most preferred temperature for the preheated gases is from between about 1600° F. and about 1900° F. Generally the final temperature is attained in the secondary preheating zone immediately upstream of the baffle 28 by the introduction of the independent relatively small stream of oxygen as above described. The quantity of oxygen introduced at the secondary preheater may vary from about ⅓ of 1% to about 5% by volume of the total gas passing through the primary preheater. The larger quantities of oxygen in the second preheater stage are required only when the mixture emerges from the primary preheater at low temperatures (e.g. about 1200° F.).

For example, in the foregoing illustration the gases from the main stream emerge from the preheater at 1660° F. and pass around a smaller tube centered in the reactor through which was introduced 43 cubic feet of cool oxygen. The secondary high concentrations of oxygen immediately mingle with the main heated gas stream to produce a secondary preheating effect. By addition of the secondary preheat the temperature of the gas from the primary preheater is raised from 1660° F. to 1750° F.

To secure the highest yields of acetylene it is desirable to preheat the oxygen and methane reactants to as high a temperature as possible before the limited combustion reaction is initiated. While the preheating device described in my copending application is unique and the process of heating the combined reactants at elevated temperatures without combustion is highly unexpected, there are certain limitations upon the method which are inherent in the process and apparatus as are now known. For example, the alloys now available are unable to stand any substantial pressure or physical shock at the extreme temperatures which would be considered optimum for preheating of the gaseous reactants. Thus if one were to preheat the mixtures in the tube 68 at a temperature approaching 1900° F., the danger of explosion becomes greatly increased and the risk of burning out the tubular preheater by premature combustion and excessive heat is also increased. Accordingly in the practice of this invention it is preferred to preheat the mixture to temperatures approaching the preferred range of temperatures in the preheater tube 68 followed by a secondary preheating carried out in a forward part of a reactor immediately prior to the point where the main reaction occurs all as above described and in a manner so as to afford ready control of the reaction and attainment of the optimum degree of preheating. Such a process is found in the present invention by a combination of preheating the mixture of oxygen and methane in a primary preheating zone and secondarily preheating and controlling the reaction in a forward point of a refractory reactor to raise the temperature to an optimum level by the introduction of a relatively minor stream of oxygen into the main stream. The stream of oxygen gas as introduced may either be at ambient temperature or, preferably, at elevated temperatures. Generally it is desired that the temperatures of preheating before combustion be between about 1200° F. to about 2000° F. and a most preferred range of temperature is from about 1600° F. to about 1900° F. The degree of temperature rise in the secondary preheating stage may vary, but the heating effect is brought about by introducing the independent stream of oxygen into the blended stream of the reactants, and the amount of secondary preheating preferably should not be such as to require an elevation of more than about 100° F., since greater than this would require the introduction of large amounts of oxygen which is expensive and tends to promote complete combustion rather than incomplete combustion and the desired formation of acetylene. Thus a nice balance is found wherein the process of the present invention can be carried out by controlled preheating to optimum temperatures and causing combustion of the preheated reactants in a manner whereby easy control is afforded and high yield of product is assured at relatively low cost. After the primary and secondary preheating stages the gases are permitted to react in a proximate zone of the reactor beyond a baffle. The baffle serves a convenient twofold purpose in that it separates the secondary preheating stage from the main reaction chamber and also prevents the flame from moving either toward the preheating zone or being blown through the reactor to the quench area where of course the flame would be extinguished and the reaction terminated. Thus the baffle element in the reactor is highly useful in this invention to permit successful operation of the present novel process.

While a particular embodiment of this invention is shown above, it will be understood, of course, that the invention is not to be limited thereto, since many modifications may be made, and it is contemplated therefore by the appended claims to cover any such modifications as fall within the true spirit and scope of this invention.

I claim:

1. A process for producing acetylene which comprises introducing a mixture of oxygen and a hydrocarbon gas at high velocity into an elongated reaction zone said mixture being heated to a temperature between about 1200° F. and 2000° F., interjecting a relatively minor independent stream of oxygen into the forward portion of the reaction zone and the heated mixture thereby causing secondary preheating of said mixture, the amount of oxygen interjected into said heated mixture being between about ⅓ of 1% and 5% by volume of the mixture, passing the combined stream against and through a baffle plate in the reaction zone adjacent and beyond which an acetylene-producing reaction is initiated and the temperature is raised to acetylene producing conditions above about 2000° F., immediately quenching the hot products of the effluent stream from the reaction zone, removing acetylene from the quenched stream, recycling the acetylene-free gas, and maintaining and controlling reaction conditions within said reaction zone with said independent stream of oxygen.

2. A process for producing acetylene which comprises preheating a flowing mixture of oxygen and methane to a temperature between about 1200° F. and 2000° F., said flow being at a rate sufficient to prevent combustion thereof, passing the heated mixture at a high velocity through an elongated reaction zone, interjecting a relatively minor independent stream of gaseous oxygen into the elongated reaction zone and the aforesaid preheated stream causing secondary preheating of the gaseous reactant stream, the amount of oxygen interjected into said preheated mixture being between about ⅓ of 1% and 5% by volume of the mixture, passing the combined stream of heated gases against and through a baffle element maintained in an expanded portion of the reaction zone, whereby the reaction between oxygen and methane is initiated beyond the baffle and the temperature elevated to acetylene-producing conditions above 2000° F., immediately quenching the effluent reaction products at a point beyond the baffle reaction zone, separating the acetylene produced thereby from the effluent stream.

3. The process of claim 2 wherein the independent stream of oxygen is preheated before interjection into the reaction zone.

4. A process for preparing acetylene which comprises preheating a flowing mixture of oxygen and methane to a temperature between about 1600° F. and 1900° F., said flow being at a rate sufficient to prevent combustion thereof, passing the heated mixture at a high velocity through an elongated reaction zone, interjecting a relatively minor independent stream of gaseous oxygen into the elongated reaction zone and the aforesaid preheated stream of gases causing thereby concomitant heating of the gaseous reactant stream, the volume of interjected oxygen in said stream being between about ⅓ of 1% and 5% of the resulting mixture, passing the combined stream of heated gases against and through a baffle element maintained in an expanded portion of the reaction zone whereby the reaction between oxygen and methane is initiated and the temperature elevated to acetylene producing conditions above about 2000° F., immediately quenching the effluent reaction products at a point beyond the baffled reaction zone, and recovering acetylene from the effluent quenched products.

5. A process for producing acetylene which comprises preheating a flowing mixture of oxygen and methane wherein the oxygen is present in less than one half the stoichiometric amount for complete combustion, said flow of mixture being at a rate sufficient to prevent combustion thereof, passing the heated mixture at a high velocity into an elongated reaction zone, interjecting a relatively minor independent stream of gaseous oxygen into the elongated reaction zone and the aforesaid preheated mixture causing thereby secondary preheating of the mixture to a temperature between about 1200° F. and 2000° F., the volume of interjected oxygen in said stream being between about 1/3 of 1% and 5% of the resulting mixture, passing the combined stream of heated gases against and through a baffle element maintained in an expanded portion of the reaction zone whereby the reaction between oxygen and methane is initiated and the temperature elevated to acetylene producing conditions above about 2000° F., immediately quenching the effluent reaction products at a point beyond the baffled reaction zone, and recovering acetylene from the effluent quenched products.

6. The process of claim 5 wherein the temperature is between about 1600° F. and about 1900° F.

7. A process of producing acetylene which comprises preheating a stream of methane and oxygen to a temperature between about 1200° and 2000° F., the amount of oxygen in said stream being less than required for the complete combustion of the methane therein, said stream during preheating moving at a high linear velocity to prevent substantial combustion of said methane therein, then passing the preheated stream through an enlarged reaction zone having a baffle element positioned therein, introducing a small amount of an independent stream of oxygen into the preheated stream in said reaction zone to effect a secondary preheating, the volume of said independent oxygen stream being between 1/3 of 1% and 5% of the total mixture, passing the total mixture against and around said baffle element whereby methane combustion is initiated at a temperature in excess of about 2000° F., immediately quenching the reaction products and separating acetylene therefrom.

8. A process of producing acetylene which comprises preheating a stream of methane and oxygen to a temperature between about 1200° and 2000° F., the amount of oxygen in said stream being less than that required for the complete combustion of the methane therein, said stream during preheating moving at a high linear velocity to prevent substantial combustion of said methane therein, then passing the preheated stream in an axial direction into a forward portion of an elongated reaction zone having a transverse baffle element positioned therein, interjecting from 1/3 of 1% to 5% by volume of an independent stream of oxygen into said preheated stream in said forward portion and in essentially the same direction of movement whereby secondary preheating is effected, impinging the resulting mixture against said baffle element whereby combustion of said methane is initiated at a temperature in excess of about 2000° F., immediately quenching the reaction products and separating acetylene therefrom.

9. The process of claim 7 wherein said independent stream of oxygen is preheated before interjection into said preheated stream.

References Cited in the file of this patent
UNITED STATES PATENTS

| | | |
|---|---|---|
| 2,377,245 | Krejci | May 29, 1945 |
| 2,572,664 | Robinson | Oct. 23, 1951 |
| 2,664,450 | Sachsse et al. | Dec. 29, 1953 |
| 2,817,690 | Lobo | Dec. 24, 1957 |
| 2,823,243 | Robinson | Feb. 11, 1958 |
| 2,833,839 | Lehrer | May 6, 1958 |